United States Patent [19]
LeMaster

[11] Patent Number: 5,340,326
[45] Date of Patent: Aug. 23, 1994

[54] CONNECTIVITY MANAGEMENT SYSTEM

[76] Inventor: Dolan M. LeMaster, 2536 E. Inglewood, Mesa, Ariz. 85283

[21] Appl. No.: 874,124

[22] Filed: Apr. 24, 1992

Related U.S. Application Data

[63] Continuation of Ser. No. 466,249, Jan. 17, 1990, which is a continuation-in-part of Ser. No. 220,313, Jul. 18, 1988, abandoned.

[51] Int. Cl.$^5$ .............................................. H01R 4/60
[52] U.S. Cl. .................................... 439/207; 439/540
[58] Field of Search ........... 439/1, 4, 31, 33, 207–216, 439/623, 624; 361/428; 174/48, 58, 49; 312/223; 52/36

[56] References Cited

U.S. PATENT DOCUMENTS

| | | | |
|---|---|---|---|
| 4,654,756 | 3/1987 | Wilson et al. | 361/428 |
| 4,685,255 | 8/1987 | Kelley | 52/36 |
| 4,734,826 | 3/1988 | Wilson et al. | 361/428 |
| 4,758,536 | 7/1988 | Miller et al. | 439/405 |

*Primary Examiner*—David L. Pirlot
*Attorney, Agent, or Firm*—Lowell W. Gresham; Jordan M. Meschkow; Don J. Flickinger

[57] ABSTRACT

A system for integrating and modularizing wiring within a building is disclosed. A unitized destination terminal integrates a diverse assortment of communication connectivity needs with power distribution. The terminal mounts near a work surface in each one of a multiplicity of work areas within a building. An integrated communication cable transports a variety of different communication circuits away from the work areas toward a common communication distribution area. The integrated cable is routed through an integrated raceway, which manages the placement and housing of communication systems as a unit that additionally includes power distribution systems. Cabinets at the common communication distribution area and at a central connectivity area for the building terminate communication cabling at a variety of socket connectors. The central connectivity area couples to PBX, mainframe computer controllers, or other connectivity devices. A variety of jumper cables mate with the socket connectors in a selectable and easily alterable pattern to couple the connectivity devices, such as a PBX, to the destination terminals in the work areas. Extensive modularization and off-site connectorization permit the present invention to be installed quickly and cheaply without the use of highly skilled electricians. The extensive connectorization, as opposed to hardwiring, and integrated management of a wide assortment of communication channels promotes flexibility in the present invention.

3 Claims, 8 Drawing Sheets

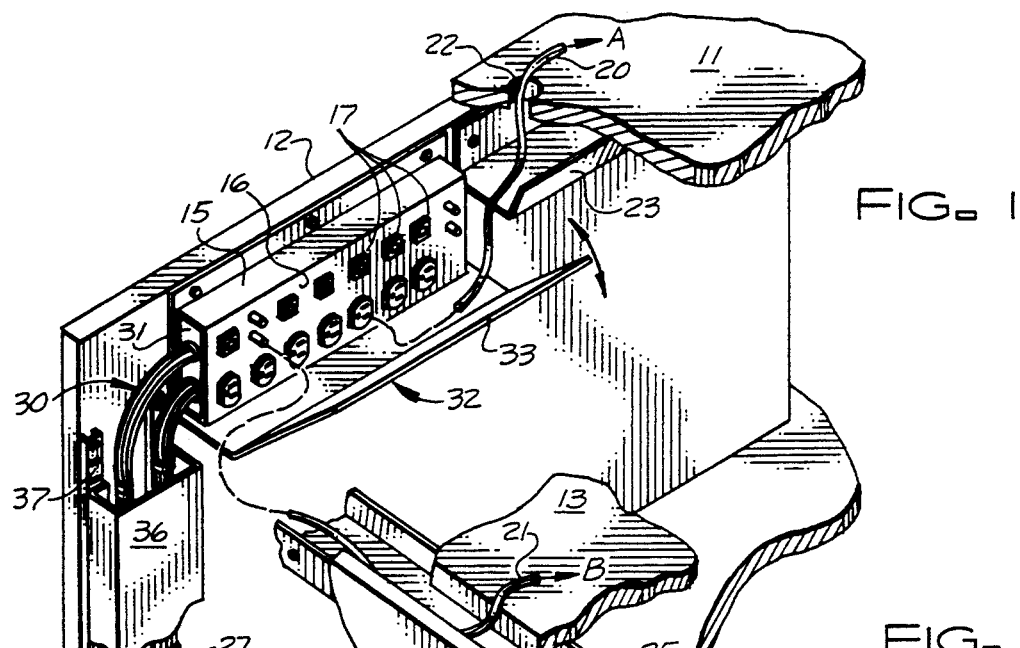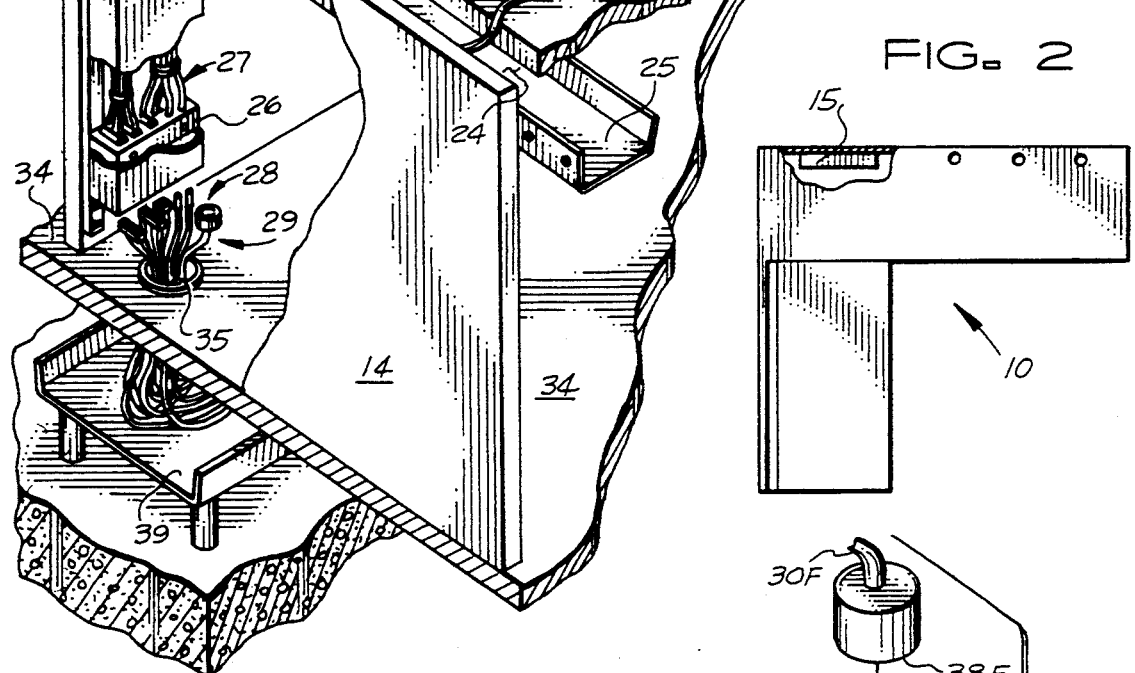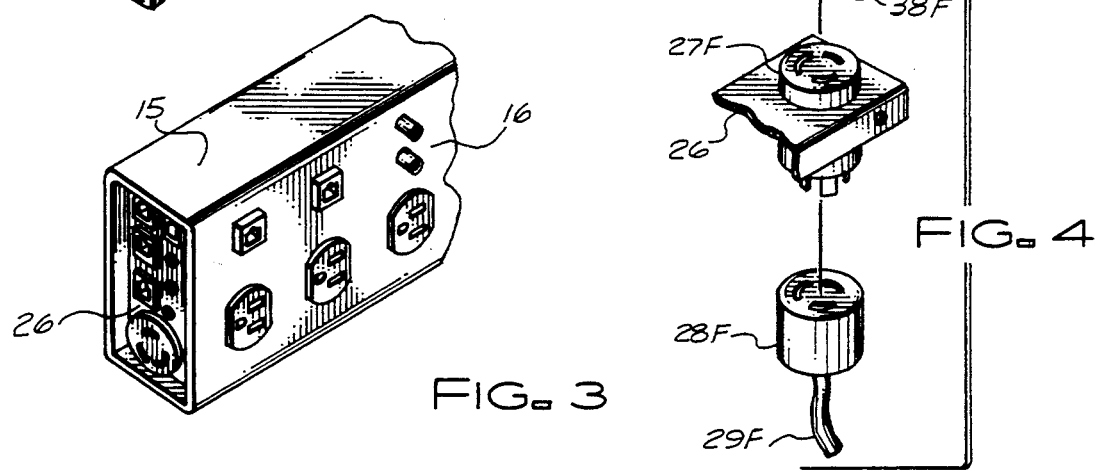

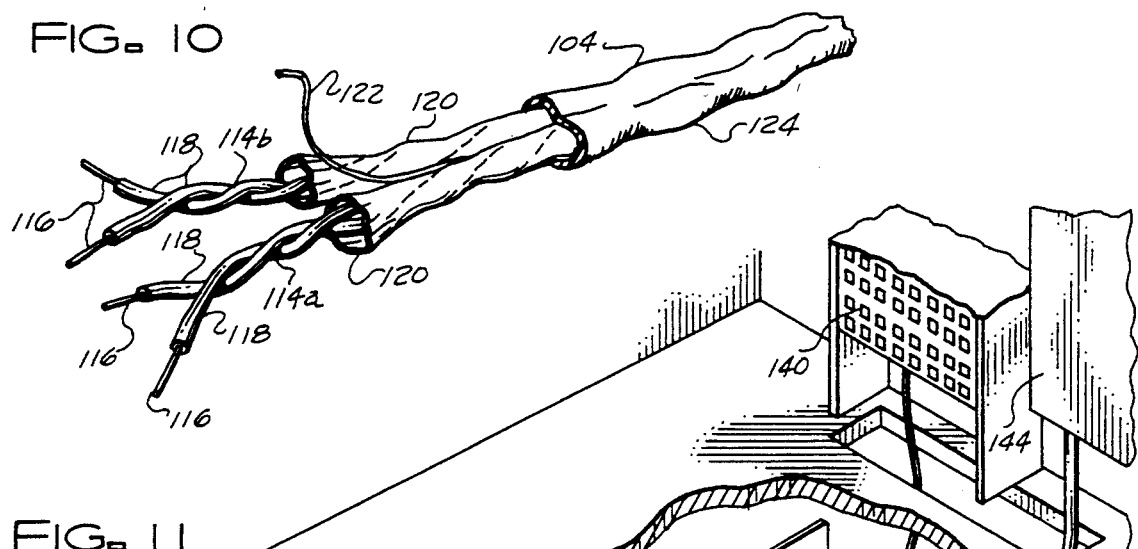
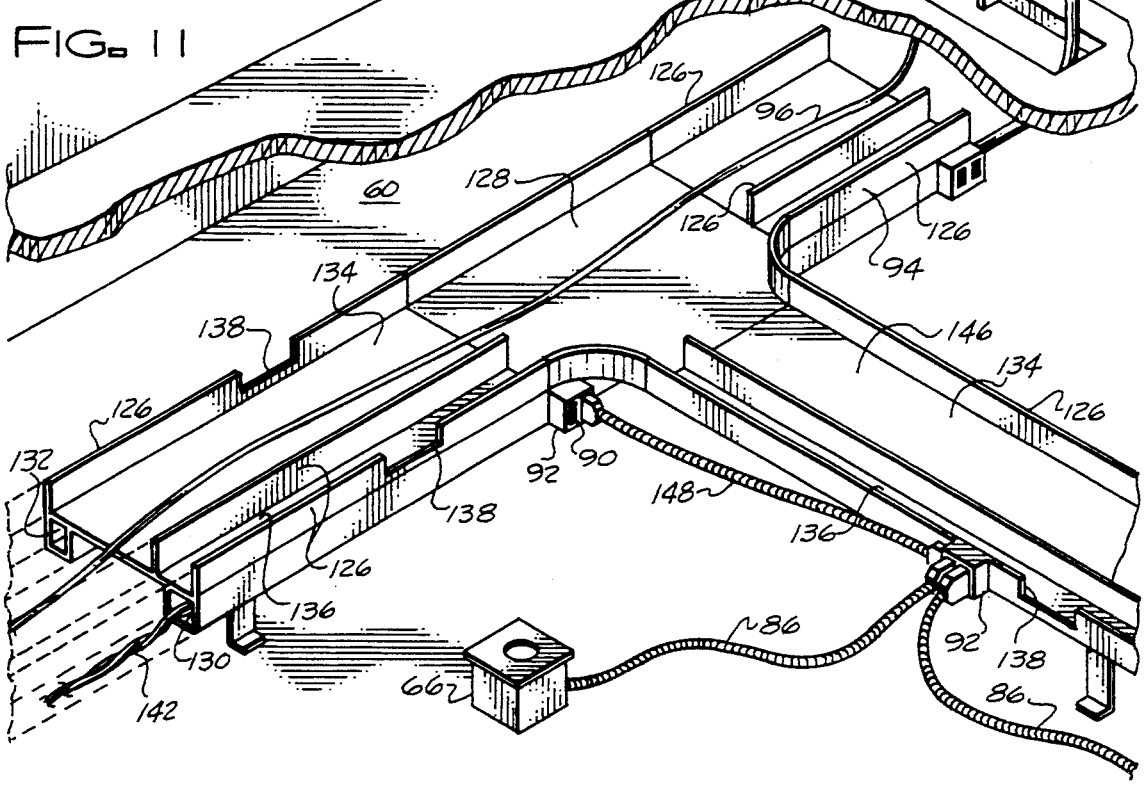
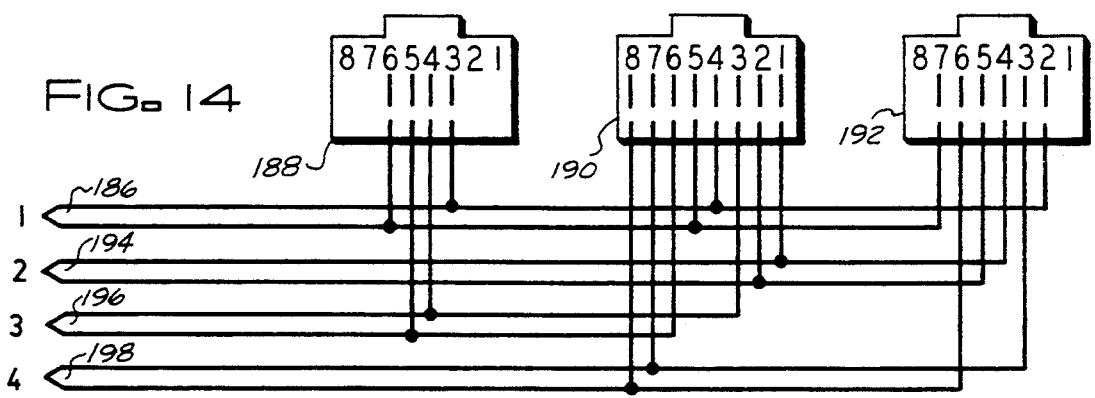

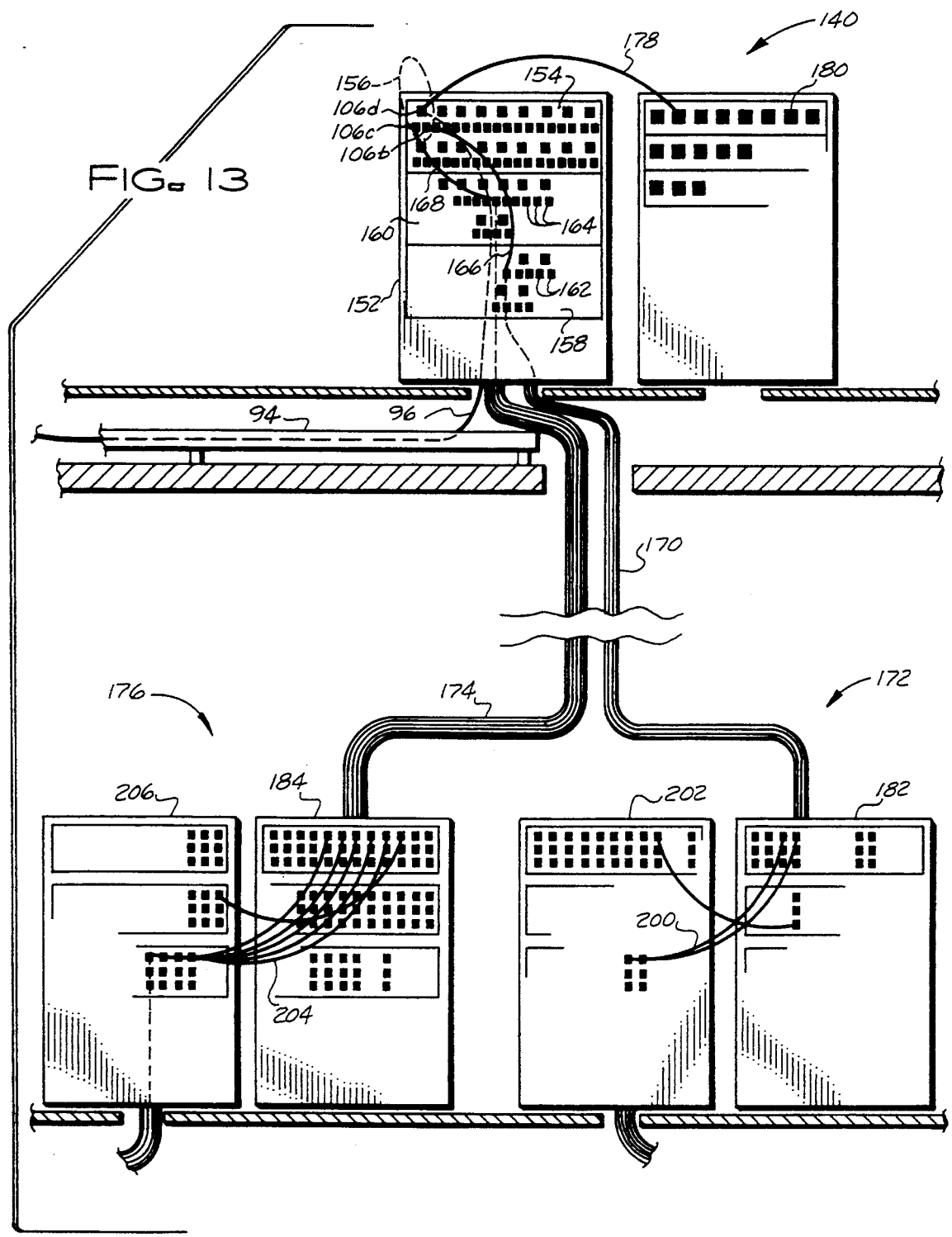

DATA TABLE RECORD

| EXTERNAL IDENTIFIER | CIC CROSS-CONNECT PANEL TO DISTRIBUTION CABINET PANEL | | CIC TO IIC CIC DISTRIBUTION CABINET PANEL TO ICC INTERCONNECT PANEL | | IIC ICC INTERCONNECT PANEL TO INTEGRATED PANEL | | ICC TO WORK STATION INTEGRATED PANEL TO WORK STATION | | WORK STATION | |
|---|---|---|---|---|---|---|---|---|---|---|
| | CROSS-CONNECT PANEL TERMINATION POSITION | CROSS-CONNECT CABLE LABEL | DISTRIBUTION CABINET PANEL TERMINATION POSITION | JUMPER CABLE LABEL | INTER-CONNECT PANEL TERMINATION POSITION | JUMPER CABLE LABEL | INTEGRATED PANEL TERMINATION POSITION | INTEGRATED CABLE LABEL | GRID LOCATION | DEVICE TYPE |

CONNECTIVITY MANAGEMENT SYSTEM

RELATED APPLICATIONS

This invention is a continuation of U.S. Ser. No. 07/466,249, filed Jan. 17, 1990, which is a continuation-in-part of "Work Station Pre-Wiring Module" by Dolan M. LeMaster, Ser. No. 07/220,313, filed Jul. 18, 1988.

BACKGROUND OF THE INVENTION

1. Field of the Invention

The present invention relates generally to electrical power and communications connections and wiring within buildings. More specifically, the present invention relates to apparatuses and methods for efficiently integrating and managing such connections for cost effective wiring installation and future flexibility.

In one aspect, the invention relates to workstations, here defined as desks, work surfaces, and the like, at which a person utilizes various equipment and devices during the course of the work day. The invention relates to work stations at which the various equipment and devices require connection to power, signal, data, communication lines and the like. Specifically, the invention relates to means and method whereby workstations may be readily pre-wired to accommodate the various line connections required by a wide variety of equipment and devices anticipated to be used at the workstation. The invention is intended for use with buildings and workstations of various designs, styles and manufacture.

2. Prior Art

The modern office has a wide assortment of connectivity or wiring circuits in equipping employee work areas. AC electrical power, telephone voice communication, low speed data communication between computer terminals and central computers, and high speed local area network (LAN) data communication represent a few of the most common connectivity needs of employee work areas. In addition, many work areas use multiple voice circuits to support multiple phone lines, facsimile machines, modems, and the like. Often, multiple data lines communicate computer data to printers, plotters, remote input devices, and the like. Increasingly, work areas access fiber optic, broadband LAN, and video communication links.

Conventionally, the management of all these connectivity needs has been performed in an extremely makeshift, haphazard, and inefficient manner. As a result, work area connectivity has become extremely expensive, for both original wiring installation and later-occurring changes. For example, buildings often use independent systems to distribute power, voice, and data, LAN, and video. This leads to a costly duplication in materials and labor. In addition, it leads to a costly lack of organization in overall building connectivity.

In addition, buildings often utilize connectivity systems which rely heavily upon on-site, hard-wired connections. Hard-wired connections require each end of a wire to be prepared. Such preparations typically involve removing insulation, dressing wire ends, identifying individual wires, applying terminators, attaching wires, applying strain reliefs, and the like. The attaching of a wire may be to another wire, a connection block, terminal, or the like. Accordingly, such hard-wired connections must be patiently and painstakingly performed by highly skilled, and expensive, personnel. Moreover, after wiring preparations, such highly skilled personnel must test and occasionally trouble-shoot a network of such wires. As a result, costs associated with the installation of conventional connectivity systems often reach astronomical proportions.

The modern office also changes in its physical environment at an increasing pace. These changes in the physical environment impose frequent changes in work area connectivity. However, conventional connectivity systems are extremely inflexible. Hard-wired connections again require the services of highly skilled personnel to make necessary changes. Often times, such personnel are not available when needed, and entire schedules suffer as a result. When buildings employ separate connectivity systems for power, voice communication, data communication, LAN communication, video communication, and the like, the overall connectivity structure becomes extremely unorganized. False floors, ceilings, and wiring raceways, often resemble a "rat's nest" of cabling. Accordingly, minor connectivity changes often turn into extremely complicated and time consuming procedures due to this disorganization. Often, connectivity system changes are more efficiently implemented by entirely scrapping a prior system and installing an entirely new connectivity system when only moderate changes are imposed in a physical environment.

The prior art describes a few devices which address connectivity problems in the modern office. However, most of such devices address minor portions of the overall problem, and therefore fail to significantly reduce connectivity costs or to increase connectivity flexibility. For example, various manufacturers supply breakout boxes, connectors, raceways, ducts, and the like which serve as modular components that a designer may couple together to implement a connectivity system. However, such modular components fail to address the integration of various connectivity systems and the overall end-to-end connectivity problem. Accordingly, the use of such components provides little help in significantly reducing installation costs or in improving flexibility.

Similarly, some prior art devices serve as specifically and uniquely designed employee workstations. Such workstations are generally undesirable because they severely limit furniture selections. For example, the available selections are often very expensive and fail to meet aesthetic requirements. Of course, such furniture addresses connectivity problems only at one end of the connections and fails to address overall end-to-end connectivity.

With respect to such workstations, a person is often assigned a workstation which is pristine: clear and uncluttered. A family picture, a plant, perhaps a child-made pencil holder brings a sense of belonging to the occupant of the workstation. The work surface has a personal touch and there is still an uncluttered air of efficiency remaining. Next is added a telephone, a computer terminal or personal computer, a printer/typewriter, optical data reader/writer, or maybe an oscilloscope and other test equipment. The arrangement of a variety of pieces of equipment and devices on the work surface may be functionally efficient yet the disorder produced by the concomitant clutter of power cords, signal and data lines, etc. destroys all appearance of efficiency.

Worse—because of the potential danger of tripping—is the cascade of wires and cables which flows from the work surface, to and across the floor, seeking a convenience outlet or a signal-or data-source/receptor connector.

Wilson et al. in U.S. Pat. No. 4,654,756 disclose a work surface with a power and communication module attached. The disclosure requires the use of a specialized work surface having a door closure access opening in its top to provide cable access from atop the work surface to the module attached below the work surface. Maintaining the door clear limited the useful area of the work surface. Conversely, equipment placed atop the door had to be moved each time access to the module was desired. The module itself, and the connectors thereon, were not otherwise accessible except through said door.

The Wilson et al. module was of a size as to offer potential hazard to the knees of a person seated at the work surface. Further, the disclosure made no provision for management of wires and cables running between the work surface module and areas remote from the work surface other than providing some storage for excess lengths of cable.

SUMMARY OF THE INVENTION

Accordingly, it is an objective of the present invention to provide an improved module for pre-wiring a workstation for all anticipated power and communication needs. In general, power and communication lines will be brought to the module in safe, compact, managed arrays. The module will be sized and emplaced to avoid interfering and hurtful contact with the knees of a person using the workstation.

Another object of the present invention is to provide an improved system for connectivity management within a building so that installation costs are reduced and flexibility is enhanced.

Yet another object is that the present invention reduces the amount of hard-wired connections required on-site. Accordingly, fewer services from highly skilled labor are needed in order to install a connectivity system, and costs decrease accordingly.

Still another object is that the present invention extensively uses modular components which may be pre-wired and tested off-site. Thus, efficiencies of mass production may be employed at an off-site manufacturing facility to reduce costs.

Another object is that the present invention efficiently and economically incorporates extra connectivity system capacity. Consequently, flexibility improves.

Yet another object is that the present invention integrates multiple connectivity systems together to reduce costs, keep overall connectivity organized, and enhance flexibility.

The above and other objects and advantages of the present invention are carried out in one form by a workstation pre-wiring module for wiring a workstation in anticipation of the power and communications interconnections required for efficient effective utilization of various units of equipment supported on the work surface of the workstation. The pre-wiring module comprises a work surface supported above a floor. Wire managing means are coupled to and proximate the work surface for containing and supportingly conducting power and communication lines originating atop the work surface.

A receptacle plate is coupled below and proximate the work surface, the receptacle plate bearing a variety of communication and power connectors selected for mating with connectors terminating lines from remote sources of power and remote sources and receivers of communications. Signal and power conducting means couple the receptacles and the connectors for conveying power and communications between selected ones of the receptacles and selected ones of the connectors.

The connectors borne by the connector plate comprise feed through connectors. The wire managing means comprise a wire tray. The means for coupling the receptacle plate below and proximate the work surface includes a wire tray within which the receptacle plate is coupled. This wire tray further comprises a hinged side thereon for protecting and providing access to the receptacle plate and the lines matingly coupled to the receptacles thereon.

In a preferred embodiment of the invention, the means coupling the connectors and the receptacles comprise power and signal conducting lines of sufficient length to permit coupling the connector plate below the work surface and proximate the floor.

The above and other objects and advantages of the present invention are carried out in another form by a communication connector appearance for use in a connectivity management system. The appearance includes at least two sockets which collectively terminate four pairs of wires. The first socket has a predefined shape and contacts located at each of eight predefined positions within the predefined shape. Likewise, the second socket has substantially the same predefined shape with substantially the same eight corresponding predefined positions. The first of the four pairs couples to contacts in the fourth and fifth positions of the first socket and to contacts in the second and seventh positions in the second socket. The second of the four pairs couples to contacts in the first and second positions of the first socket and to contacts in the fourth and fifth positions in the second socket. The third of the four pairs couples to contacts in the third and sixth positions of the first socket. The fourth of the four pairs couples to contacts in the seventh and eighth positions of the first socket and to contacts in the third and sixth positions in the second socket.

The above and other objects and advantages of the present invention are carried out in yet another form by an integrated electrical cable bundle for use in a connectivity management system to simultaneously transmit voice, data, and local area network (LAN) communications. The bundle includes first, second and third cables. The first cable is configured to transmit voice communication. The second cable is configured to transmit data communication, and the third cable is configured to transmit LAN communication. The first and second cables attach to opposing sides of the third cable so that the bundle acts as a single unit.

The above and other objects and advantages of the present invention are carried out in another form by an integrated wiring distribution raceway for use in a connectivity management system to house both communication and Dower wiring. The raceway includes a plurality of raceway walls. A first group of the raceway walls substantially encloses a power channel within the raceway. A second group of the raceway walls defines a communication channel which is substantially open along a top side thereof. The first and second groups of walls share a common wall. Communication wiring resides within the communication channel, and a power cable resides within the power channel. A connector mounts to the first group of walls near the power channel. Contacts of the connector couple to the power cable.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 1 is a partial perspective drawing illustrating the pre-wiring of an L-shaped workstation utilizing the pre-wiring module of the invention;

FIG. 2 is a top view of the L-shaped workstation of FIG. 1;

FIG. 3 illustrates a receptacle plate and a connector plate as integral parts of the same wire enclosure;

FIG. 4 is a detailed illustration of the use of feed-through connectors in the connector plate;

FIG. 10 shows details of a local area network (LAN) cable portion of the integrated communication cable bundle of FIG. 8;

FIG. 11 shows an integrated raceway constructed in accordance with the teaching of the present invention;

FIG. 13 shows cabling interconnections and methodology in accordance with the teaching of the present invention;

FIG. 14 shows a schematic of relative wiring relationships between sockets of a connector appearance utilized in accordance with the present invention;

FIG. 16 shows a structure for a data table utilized in accordance with the present invention.

DETAILS OF THE PREFERRED EMBODIMENTS

Figure 5:
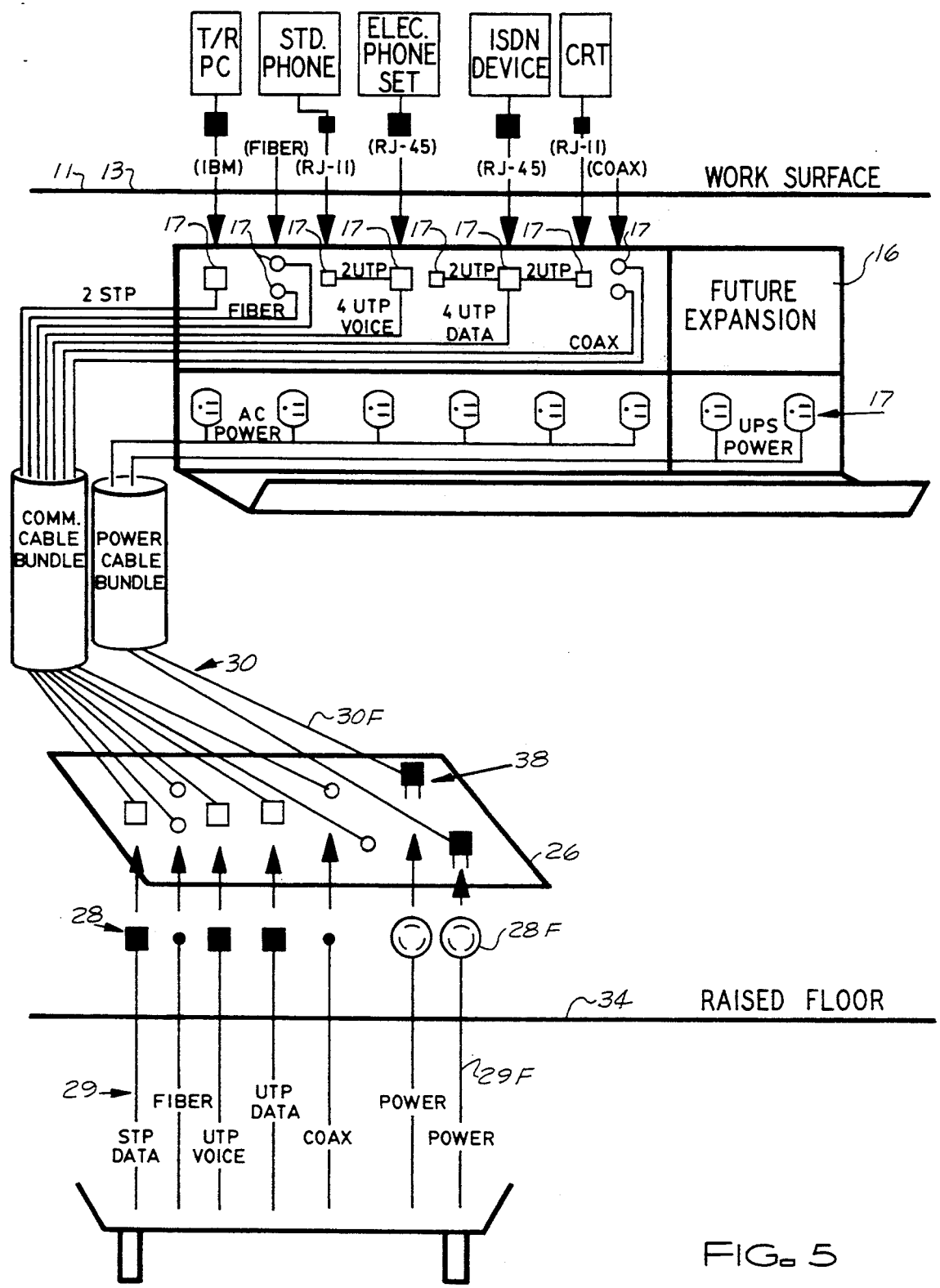
FIG. 5 is a detail illustration of elements of the pre-wiring module.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

FIG. 1 illustrates in partial detail an L-shaped workstation 10 (see FIG. 2) having a first work surface 11 supported by a vertical panel 12. A second work surface 13 is supported, in conventional manner, not shown, by panel or wall 14. Coupled to panel 12 is wire enclosure or breakout box 15 having as its face receptacle plate 16 having thereon a variety of communication and power receptacles or connectors 17 selected for mating with various units of equipment anticipated to be usefully supported by work surfaces 11 and 13. For example, a power line 20 from equipment A on work surface 11 will mate with a power receptacle on receptacle plate 16 while a fiber optic cable 21 from equipment B on work surface 13 mates with the appropriate optical receptacle on said plate 16.

Power line 20 from equipment A passes through opening 22 in work surface 11 and runs along wire tray 23 in its passage in receptacle plate 16. Opening 22 is provided in surface 11 by the manufacturer or by the user. Usually, several such openings 22 will be incorporated, as indicated, along the rearmost portion of work surface 11 so that power and communication lines from various pieces of equipment on surface 11 may be readily removed from the work surface and stored in wire tray 23, thus reducing wire clutter atop work surface 11.

In conventionally mounting certain work surfaces, for example surface 13, a space results between the work surface and its mounting panel; for example, the space 24 between work surface 13 and panel 14. Space 24 provides ready passage for various power and communication lines, e.g. line 21, from equipment B atop surface 13 to wire tray 25 coupled below surface 13. Such lines are routed along tray 25 to receptacle plate 16 for mating there with the appropriate receptacle 17.

Wiring enclosure 15 rests within its own wire tray 32, which has a hinged access panel 33 giving access to receptacle plate 16 and otherwise protecting plate 16 and the equipment line receptacles mated therewith.

Interconnector plate 26 is coupled adjacent receptacle plate 16. Interconnector plate 26 bears a variety of communication and power connectors 27 selected for mating with connectors 28 and terminating lines 29 from remote sources of power and remote sources and receivers of communications.

In order to convey power and communications between selected ones of receptacles 17 and selected ones of connectors 27, wires/cables 30 are utilized to couple appropriate receptacle-connector pairs. In the preferred embodiment, wires/cables 30 are of a length such that connector plate 26 is approximately 4 inches above raised floor 34 (no limitation implied or intended). Power and communication lines 29 and their terminating connectors 28 are drawn up from floor access opening 35 approximate connector plate 26. Connectors 27 on connector plate 26 to complete the integration of the pre-wired workstation into the building communication and power system.

It is not intended to limit the approach of power and communication lines to an underfloor approach. A ceiling drop may be just as advantageous as an under-floor approach. Wall or floor surface approaches, while not as desirable, are feasible if the line runs are managed and safely contained.

To maintain wire/cables 30 in neat array, a vertical wire manager, or slot box, 36 is provided. Slot box 36 is removably coupled to panel 12 via adjustable hanger brackets 37 in conventional manner. Slot box 36 may be easily removed to provide ready access to wires/cables 30 and connector plate 26.

While it is not a presently preferred embodiment, this disclosure conceives of the case in which wires/cables 30 have such minimal lengths that connector plate 26 is drawn up to wire enclosure 15 to effectively replace end plate 31 of enclosure 15. Such a result is indicated in FIG. 3. In this instance, power and communication lines 29 and their terminating connectors 28 will be drawn upward from floor access opening 35, through slot box 36 to mate with the appropriate connectors 27, now at the end of enclosure 15; that is, lines 29 will follow the path now indicated for wire/cables 30 in FIG. 1.

The invention also conceives of the use of feed-through connectors with connector plate 26. This arrangement is shown in FIG. 4 wherein a particular one of connectors 27 is illustrated as feed-through connector 27F. In this instance, wires/cables 30 must each be terminated in a connector 38 as, for example, connector 38F of FIG. 4.

FIG. 5 is a schematic presentation of the structural details just disclosed and illustrated in earlier figures. FIG. 5 provides an example of the wire and connector types utilized in pre-wiring a workstation for use with equipments of the types indicated.

Figure 6:
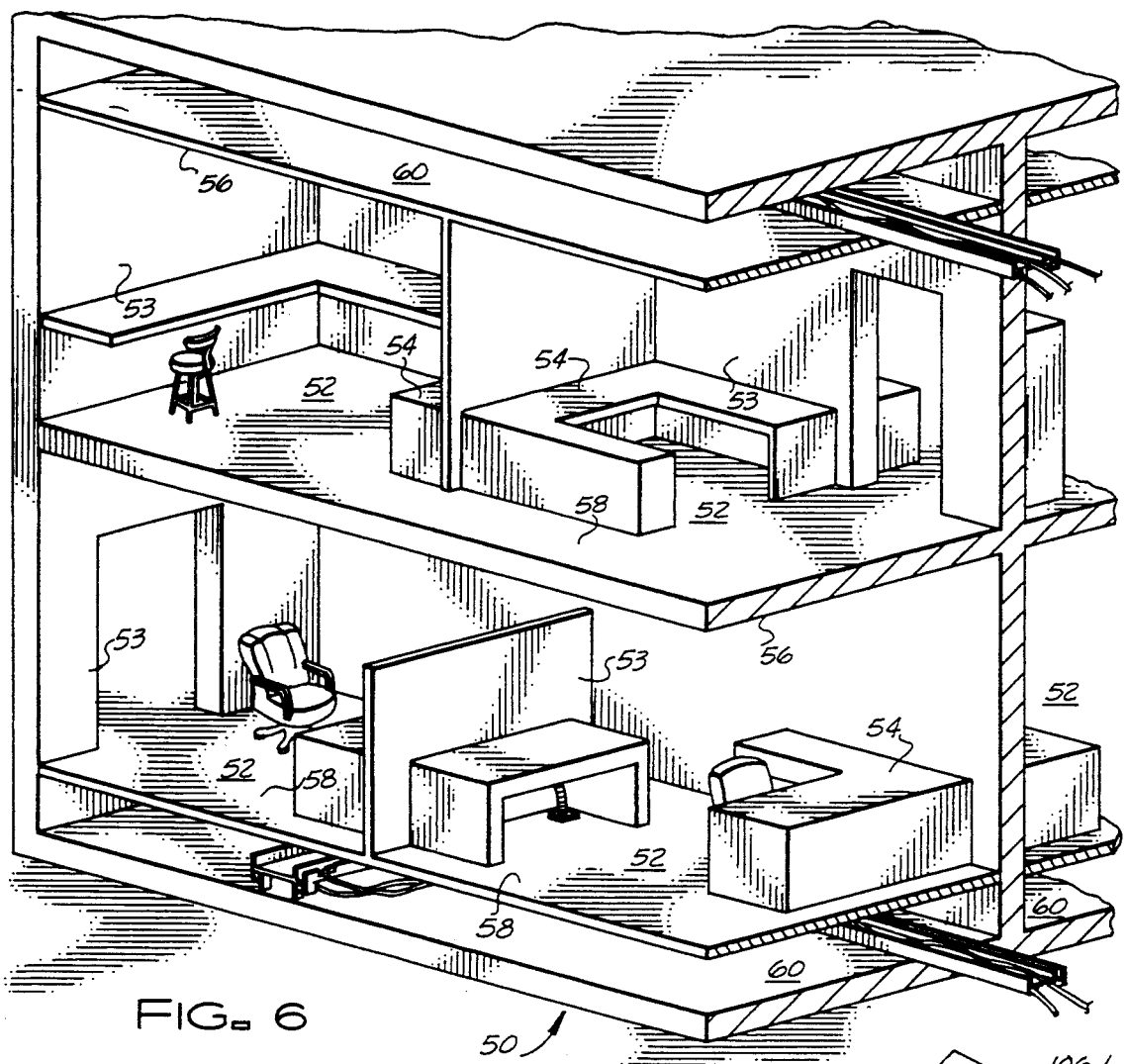
FIG. 6 shows a building interior in which a multiplicity of work areas are formed.

FIGS. 6–14 present alternate and additional aspects of the present invention. The present invention operates in a building 50, as represented in FIG. 6. Building 50 includes a multiplicity of spaced apart work areas 52 at which employees or other individuals conduct their activities. Typically, work areas 52 are separated by walls 53, which may be permanent features of building 50 or movable modular structures. Work areas 52 may be spread over diverse sections and multiple floors of building 50. Each of work areas 52 typically includes a work surface 54, which may represent a modular or conventional table, bench, desk, counter, or the like. As is conventional, work surfaces 54 are spaced between a ceiling 56 and a floor 58. Plenums 60, through which cabling may be routed to and from work areas 52, reside above ceiling 56 or below floor 58 (or both). In addition, plenums 60 may connect stories together in a multistory building.

Figure 7:
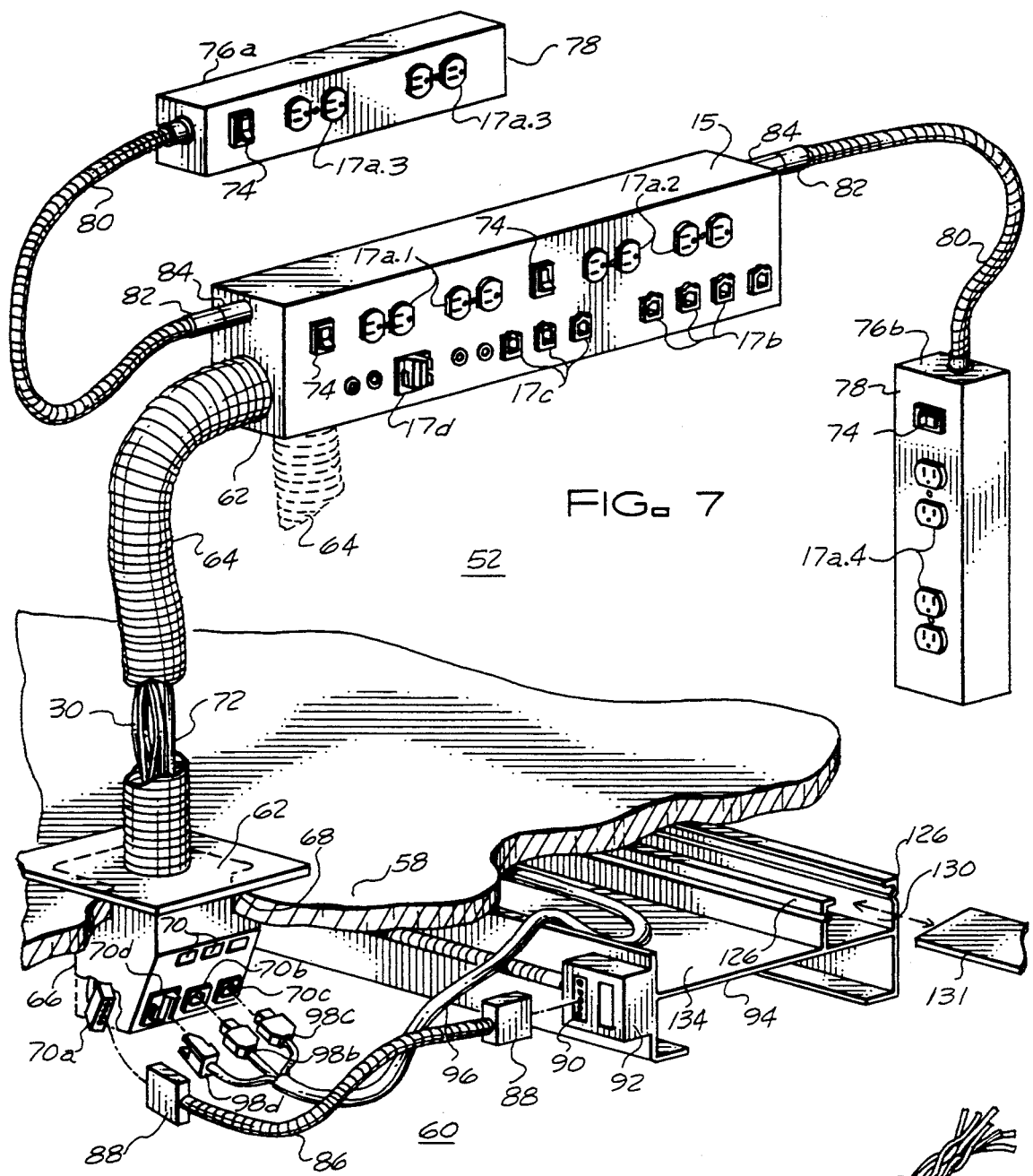
FIG. 7 shows a second preferred embodiment of a unitized destination terminal constructed in accordance with the teaching of the present invention.

FIG. 7 shows a second embodiment of a unitized destination terminal 62 constructed in accordance with the teaching of the present invention. Terminal 62 is manufactured off-site at a facility (not shown) remote to building 50 (see FIG. 6), then transported to and installed within building 50 as a single unit. Within building 50, a multiplicity of work areas 52 have their own destination terminals 62. As discussed above, terminal 62 includes a breakout box 15 which presents an assortment of receptacles or connectors 17. During installation of the connectivity system of the present invention, breakout box 15 is mounted near a work surface 54 (see FIG. 6) as discussed above in FIGS. 1–5, using any convenient mounting means.

Destination terminal 62 additionally includes a flexible duct 64 which, at one end thereof, attaches to breakout box 15. Preferably, duct 64 is made from a relatively safe flexible and plastic material, such as polyvinyl chloride. As shown in FIG. 7, destination terminal 62 may be configured in different models. In one model, for example, duct 64 attaches to a side of breakout box 15 and in another model, for example, duct 64 attaches to a bottom of breakout box 15. Such diverse models permit greater selection in adapting destination terminal 62 to individual furniture configurations. In addition, the flexibility feature permits duct 64 to be routed through a variety of paths so that terminal 62 can conform to individual furniture configurations and aesthetic requirements.

An escutcheon box 66 attaches to another end, remote from breakout box 15, of flexible duct 64. In the preferred embodiments of the present invention, escutcheon box 66 attaches to floor 58 or to wall 53 near floor 58 (see FIG. 12, discussed below) in any convenient manner. However, nothing prevents escutcheon box 66 from attaching to or near ceiling 56 (see FIG. 6) or to other portions of building 50. A hole 68 in floor 58, as shown in FIG. 7, allows wires, cables, and the like, to extend between a plenum 60 and a work area 52. Escutcheon box 66 resides within and/or over hole 68 so that a well maintained boundary is retained between plenum 60 and work area 52. Preferably, escutcheon box 66 is constructed from metal to promote fire safety.

In addition, escutcheon box 66 houses a plurality of connectors 70. Connectors 70 couple to wires/cables 30 which extend within duct 64 to breakout box 15 and couple to corresponding connectors 17 of breakout box 15. In particular, escutcheon box 66 houses a power connector 70a, a voice connector 70b, a data connector 70c, and a local area network (LAN) connector 70d.

Additional connectors 70 housed by escutcheon box 66 may include an integrated switched data network (ISDN) connector, fiber optic connector, and a video or coaxial connector. However, in the preferred embodiment, such additional connectors 70 are not installed at the remote fabrication facility, discussed above. Generally speaking, such additional connectors, and their related wiring, are utilized too seldom in buildings to support the increased material cost of incorporating them within a multiplicity of destination terminals 62. Nevertheless, within the preferred embodiment one or more flexible, hollow tubes 72 are installed through duct 64 between escutcheon box 66 and breakout box 15 at locations designated for fiber optic and coaxial connectors so that such connectors and corresponding wiring or cabling may be installed later with a minimum amount of difficulty.

Preferably, connectors 70 are all standard socket-type connectors. For example, voice and data connectors 70b and 70c are preferably conventional RJ-45, 8-contact modular phone sockets. Connector 70b is intended to carry voice communication while connector 70c is intended to carry data communication. Of course, nothing prevents this scheme from being reversed. Likewise, LAN connector 70d is preferably a conventional IBM LAN socket. In the preferred embodiment, power connector 70a is a 5-pin socket which is configured to carry up to four independent AC electrical power circuits with a common ground.

As those skilled in the art will recognize, voice communication generally refers to communication transmitted through phone networks. Such communication is typically analog data which exhibits frequencies less than 3000–6000 Hz. Data communication generally refers to relatively low-speed computer signals which typically, but not necessarily, operate at data rates of 19.2 Kbps or less. Such communication typically occurs between mainframe computers and remote terminals, between computers and printers or other data I/O devices, or between computers using low speed data links. For purposes of the present invention, LAN communication is distinguished from data communication. LAN communication is well known to those skilled in the art and typically represents higher speed data than is transmitted with data communication, as discussed above. High volume data transfers between computers often occur through LAN communication using Ethernet, Token Ring, Arcnet, or other conventional local area network topologies.

Connector 70b couples to a connector appearance 17b of breakout box 15. Likewise, connectors 70c and 70d couple to a respective connector appearance 17c and connector 17d of breakout box 15. Each of connector appearances 17b and 17c includes three standard modular phone sockets, as discussed below in connection with FIG. 14, while connector 17d is preferably a conventional IBM LAN socket. Four pairs of wires are routed between each of connectors 70b and 70c and appearances 17b and 17c, respectively.

Connector 70a is preferably physically separated within escutcheon box 66 from connectors 70b–70d to enhance safety and reduce electrical interference from power to communication signals. Connector 70a couples to connectors 17a, which are standard AC duplex outlets. In addition, circuits between connectors 70a and 17a may include switches or circuit breakers 74 as is conventional in the distribution of AC power. Of connectors 17a, connectors 17a.1 and 17a.2 may advantageously couple to separate ones of the power circuits carried by connector 70a. The use of individual power circuits allows the distribution of greater amounts of power than could be distributed by a single circuit and isolates the circuits from one another for improved performance of equipment which couples to such circuits. For example, one of these circuits may supply uninterruptable power for use by a personal computer (not shown) within work area 52.

Destination terminal 62 may optionally include satellite modules 76a and/or 76b for distribution of power to locations remote from breakout box 15 within work area 52. Each of satellite modules 76 includes a satellite breakout box 78 which presents connectors 17a. Specifically, connectors 17a.3 of satellite module 76a may advantageously couple to their own one of the four power circuits carried by connector 70a, and connectors 17a.4 of satellite module 76b may advantageously couple to their own one of the four power circuits carried by connector 70a. Each of modules 76 attaches to one end of a flexible conduit 80. Electrical wiring (not shown) extends through conduit 80 to a plug connector 82. Plug connector 82 mates with a socket connector 84 mounted at sides of breakout box 15. Additional electrical wiring (not shown) couples connectors 84 to connector 70a. Preferably, plug connectors 82 and socket connectors 84 lock into place once they have been mated together so that they do not inadvertently become disconnected.

As shown in FIG. 7, a power whip 86 has plug connectors 88 installed on opposing ends thereof. One of plug connectors 88 mates with socket connector 70a of escutcheon box 66. The other of plug connectors 88 mates with a socket connector 90 mounted in a power distribution box (PDB) 92, which in turn mounts to an integrated raceway 94. As discussed below in connection with FIG. 11, raceway 94 supplies electrical power at socket connector 90. Preferably socket connector 90 is configured identically to socket connector 70a. Hence, both of plug connectors 88 have an identical configuration. Wiring within whip 86 connects plug connectors 88 together in a one-to-one correspondence, in which pins 1 of connectors 88 couple together, pins 2 of connectors 88 couple together, and so on.

In addition, an integrated communications cable bundle 96 has, installed on one end thereof, plug connectors 98b, 98c, and 98d which mate with sockets 70b, 70c, and 70d, respectively, of escutcheon box 66. Preferably, plug connectors 88 and 98 and socket connectors 70 and 90 lock into their respective places once they have been mated together so that they do not inadvertently become disconnected. Integrated cable bundle 96 also comes from raceway 94.

Moreover, in the preferred embodiment, whip 86, raceway 94, and integrated cable bundle 96 are all connectorized, a process in which connectors are installed on a cable, and tested off-site. Thus, on-site skilled labor is not required to establish connectivity between work area 52 and raceway 94. When the multiplicity of work areas 52 within a building 50 (see FIG. 6) are considered, a considerable savings in installation cost results. In addition, the present invention transports and otherwise handles power and communication signals using common, modular integrated destination terminals 62 and integrated raceways 94. As a result, connectivity organization improves. Furthermore, a wide variety of connectivity systems are accommodated by destination terminal 62 and raceway 94. Thus, flexibility is enhanced.

Figure 8:
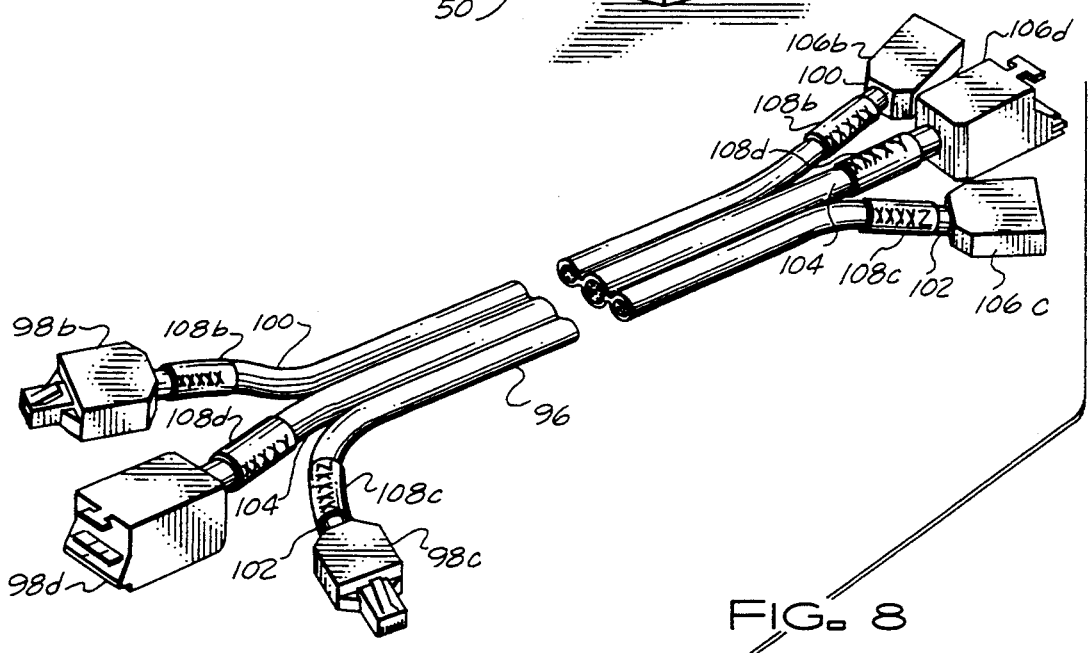
FIG. 8 shows an integrated communication cable bundle constructed in accordance with the teaching of the present invention.
Figure 9:
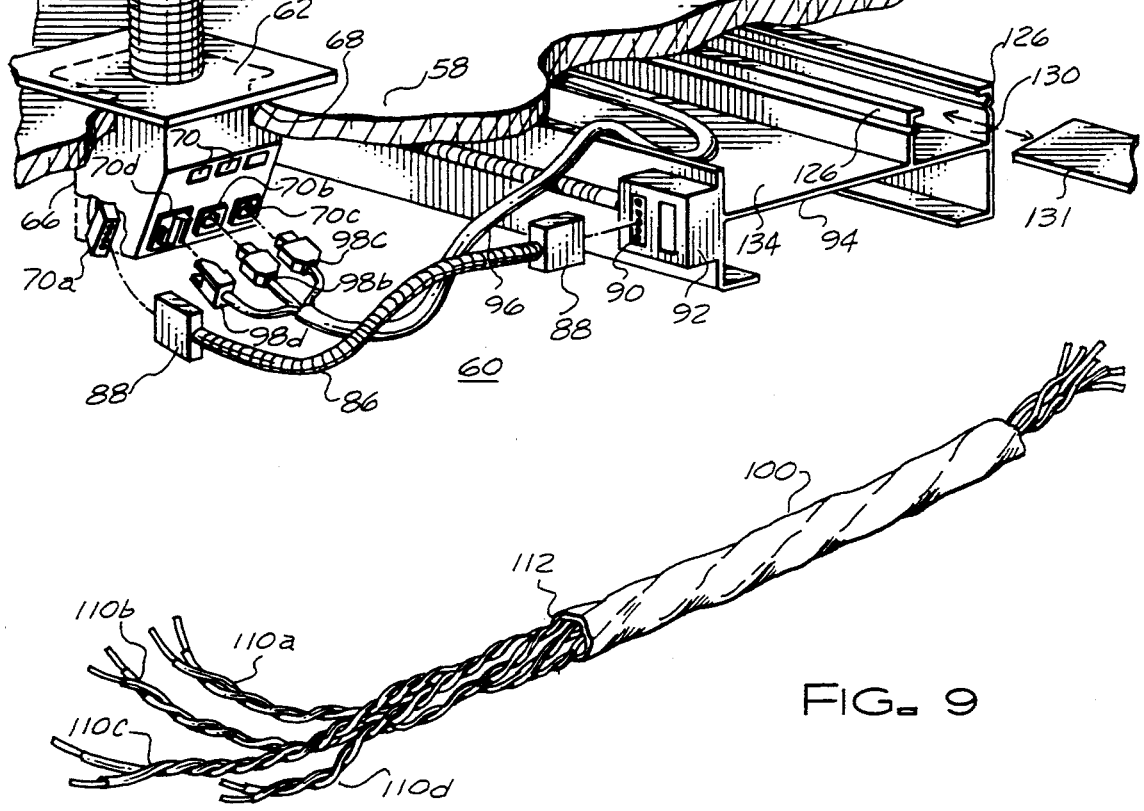
FIG. 9 shows details of a data cable portion of the integrated communication cable bundle of FIG. 8.

FIGS. 8–10 illustrate details of communications cable bundle 96. The preferred embodiment of the present invention utilizes a bundle configuration which is specifically adapted for the integrated transportation of diverse communications signals. As shown in FIG. 8, bundle 96 includes a voice cable 100, a data cable 102, and a LAN cable 104. Cables 100–104 couple to plug connectors 98b–98d, respectively. Socket connectors 106b, 106c and 106d also couple to cables 100, 102, and 104, respectively at the end of cable bundle 96 which opposes connectors 98. Each of connectors 98b, 98c, 106b, and 106c is preferably a conventional 8-contact modular phone plug or socket. Moreover, a one-to-one correspondence is followed in coupling cables 100 and 102 to connectors 98b–98c and 106b–106c, respectively Likewise, both of connectors 98d and 106d are preferably conventional IBM LAN plug and socket connectors, and a one-to-one correspondence is followed in coupling cable 104 between connectors 98d and 106d.

In addition, labels 108b, 108c, and 108d are permanently attached to cables 100, 102, and 104, respectively. Labels 108 each bear a unique identifying code. The particular nomenclature used in codifying labels 108 is not important in the present invention so long as no two labels in the connectivity system of the present invention for building 50 (see FIG. 6) bear the same information. Preferably, each of labels 108b–108d is duplicated and attached to the opposing ends of cables 100–104 respectively. Hence, the same identifying information resides at the two ends of each of cables 100–104.

Cables 100 and 102 attach to cable 104 so that cables 100 and 102 are maintained on opposing sides of cable 104. Accordingly electrical interference between communications carried by cables 100 and 102 is minimized. The present invention contemplates the attachment of cables 100 and 102 to cable 104 either through the use of a thin integral insulation membrane, as shown in FIG. 8, or through the use of a common jacket which surrounds all of cables 100–104.

As discussed above the present invention manufactures, connectorizes, labels, and tests cable bundle 96 off-site. Thus, cable bundle 96 may be installed on-site cheaply and easily. In addition cable bundle 96 unitizes wiring needs for a wide variety of communication applications. In other words, the connectivity system of the present invention integrates diverse parallel connectivity needs so that only serially-connected single units are handled to meet the diverse parallel connectivity needs.

In the preferred embodiment, voice and data cables 100 and 102 are substantially identical to one another in electrical characteristics, while LAN cable 104 differs from cables 100 and 102. However, cables 100–104 differ substantially from one another in physical appearance. Preferably, jackets for cables 100–104 exhibit different colors. In the preferred embodiment, voice cable 100 has a black jacket, data cable 102 has a blue jacket, and LAN cable 104 has a green jacket. Furthermore, this color scheme is maintained throughout the connectivity system of the present invention. In other words, cables and jumpers (discussed below) which carry voice communication are predominantly black throughout the present connectivity system, cables and jumpers which carry data communication are predominantly blue throughout the present connectivity system, and cables and jumpers which carry LAN communication are predominantly green throughout the present connectivity system. This color coding scheme enhances cable organization within building 50 (see FIG. 6).

FIG. 9 shows construction details of voice cable 100. However, since data cable 102 is electrically identical to voice cable 100, FIG. 9 also applies to construction details of cable 102. In particular, cable 100 includes four pairs of wires, referenced as pairs 110a, 110b, 110c, and 110d in FIG. 9. Each wire of pairs 110a–110d is preferably a solid copper, 22 gauge, insulated wire. In the preferred embodiment, the insulation is constructed from a polyvinyldene fluoride, such as Kynar. Moreover, each of pairs 110a–110d is twisted together to improve transmission characteristics of the pairs. Still further, the twists of pairs 110a–110d are staggered to reduce bipolar crosstalk between the pairs. In other words, the lay of each of pairs 110a–110d differs from the lay of the others of pairs 110a–110d. All of pairs 110a–110d are retained within a common jacket 112. Preferably, jacket 112 is formed from a material which promotes fire safety, such as Teflon or Kynar.

FIG. 10 shows construction details of LAN cable 104. As is conventional in connection with cables adapted for LAN communication, cable 104 includes wire pairs 114a and 114b. Each member of pairs 114a–114b includes a solid copper, 22 gauge wire 116, surrounded with a FEP 100, well known to those skilled in the art, insulation 118 to a thickness of around 0.038 inches. Hence, the overall outside diameter of each wire of pairs 114a–114b is around 0.101 inches. Each of pairs 114a–114b is twisted together and surrounded by a conductive Mylar/aluminum foil 120. A 22 gauge drain wire 122 resides between and outside of foils 120 for each of pairs 114a–114b, and a jacket 124 surrounds pairs 114a–114b, foils 120, and drain wire 122. In the preferred embodiment, jacket 124 is formed from a safe, plastic material. In particular, a polyvinyldene fluoride plastic known to those skilled in the art as Kynar 2900 is highly desirable for its safety and electrical characteristics.

Jacket 124, in conjunction with drain wire 122, serves a valuable electrical function in the present invention. In the preferred embodiment, jacket 124 is formed to have a wall thickness of at least 0.009 inches and preferably around 0.010 inches. This large thickness significantly reduces the overall impedance of jacket 124 at the high speed data rates characteristic of LAN communication. As a result, it serves in a limited capacity as a conductor to high frequency, transient electrical fields. Electrical currents responsive to such electrical fields are thus induced between jacket 124 and drain wire 122. Accordingly, jacket 124, in conjunction with drain wire 122, acts as a barrier to electrical fields. Jacket 124 retains LAN-generated electrical fields within cable 104 and blocks interference by external electrical fields. As a result, cable 104 exhibits electrical characteristics generally equivalent to those of conventional LAN cables, which include a braided, conductive shield surrounding cable wires. However, cable 104 is an improvement over such cables. Cable 104 is easier to connectorize because it contains no braided shields which would otherwise require de-braiding and dressing-back in order to make wire preparations on cable 104.

FIG. 11 shows details of integrated raceway 94. Raceway 94 integrates the routing management of wiring for diverse communications together with electrical power. As indicated in FIG. 11, raceway 94 may be formed into a lattice within plenum 60 using modular raceway components. The specific geometry of this lattice is unimportant in the present invention and may be adapted to meet and conform to architectural features of building 50 (see FIG. 6).

Generally speaking, raceway 94 includes a plurality of raceway walls 126. Walls 126 extend generally lengthwise through each module or section of raceway 94. However, walls 126 may be interrupted, as shown in a T-module 128 of raceway 94, so that wires may be routed through the interruption. Walls 126 are configured so that various channels are formed within raceway 94. Thus, a power channel 130 resides at a lower part of a first side of raceway 94, a power channel 132 resides at a lower part of a second side of raceway 94, a communication channel 134 resides above power channel 130 at an upper part of the first side of raceway 94, and a communication channel 136 resides above power channel 132 at an upper part of the second side of raceway 94. Walls 126 are further configured to generally surround power channels 130–132. On the other hand, each of communication channels 134–136 are open at their top sides. Walls 126 are constructed from a safe material, such as a metal or polyvinyl chloride. However, a conductive metal is preferred to serve as common walls between channels 130–136. The use of a conductive metal reduces electrical interference between the wiring housed in channels 130–136.

In an alternate embodiment, illustrated by FIG. 7, power channel 130 may reside beside communication channel 134 rather than above it. In this embodiment, a door 131 slidably mates with walls 126 at an upper portion of channel 130 to entirely enclose channel 130. This embodiment is desirable when a limited amount of space is available within plenum 60 because it reduces the height of raceway 94.

With reference back to FIG. 11, walls 126 which reside at the upper, exterior portions of raceway 94 bear a multiplicity of slots 138 opened therein. Slots 138 extend to the top of raceway 94. Accordingly, cable bundles 96 may be installed in channels 134 or 136 of raceway 94 simply by laying bundle 96 in channels 134 or 136 from above. Bundles 96 need not be threaded through any openings. Each bundle 96 is routed into and out from channels 134–136 at the slot 138 which resides nearest the escutcheon box 66 (see FIG. 7) to which the bundle 96 mates. In addition, raceway 94 routes bundles 96 to a common communication distribution area 140, for further connectivity management, as discussed below in connection with FIG. 13. Channels 134–136 also communicate coaxial, video, fiber optic, and other connectivity systems, if needed, in the manner discussed above for bundles 96.

Power channels 130–132 of raceway 94 carry electrical power distribution cables 142 from a power distribution center 144 of building 50 (see FIG. 6) to power distribution boxes (PDBs) 92, discussed above. PDBs 92 are preferably located at predetermined, standardized locations on raceway 94. As discussed above (see FIG. 7), one or more socket connectors 90 mount in each PDB 92. PDBs 92 are physically mounted to raceway 94 so that socket connectors 90 may electrically tap into various ones of cables 142. As discussed above, connectors 90 may carry up to four independent power circuits. Thus, a multiplicity of cables 142 may reside within channels 130–132. Since channels 130–132 and associated PDBs 92 are located on opposing sides of raceway 94, power whips 86 are arranged not to cross over or under raceway 94.

Preferably, modular sections of raceway 94 are fabricated, loaded with cables 142, connectorized, and tested off-site. Thus, raceway 94 may be installed on-site simply by plugging these sections together. Consequently, additional connectors (not shown) may be fitted on ends of such modular sections to communicate power between the sections. However, cables 142 are coupled to power distribution center 144 using conventional hard-wired, wire preparation techniques.

As an alternate embodiment, raceway 94 may be fitted with connectors 90 off-site, and then connectors 90 may be coupled to cables 142 on-site using conventional wire preparation techniques. This alternate embodiment requires additional skilled labor to install raceway 94 but removes concerns about interconnections between the modular sections of raceway 94. In the preferred embodiment, the geometry of raceway 94 does not need to change to support a wide variety of furniture positioning, room partitioning, and work area locations. Thus, the use of additional services from skilled labor during the installation of raceway 94 need not be repeated to accommodate future connectivity changes.

In yet another configuration of raceway 94, electrical power need not be routed through power channels 130–132 at all. As shown in FIG. 11, a secondary portion 146 of raceway 94 receives power at PDB 92 externally through a power whip 148. Power whip 148 is constructed substantially the same as described above for power whip 86. At PDB 92 on secondary portion 146, connectors 90 are connected in parallel. Thus, other connectors 90 within PDB 92 receive power through power whip 148 and may communicate such power to an escutcheon box 66 through a power whip 86, as discussed above. Consequently, services from skilled labor are not needed, and wire crossing geometries may be omitted by the use of external power whips 148.

Figure 12:
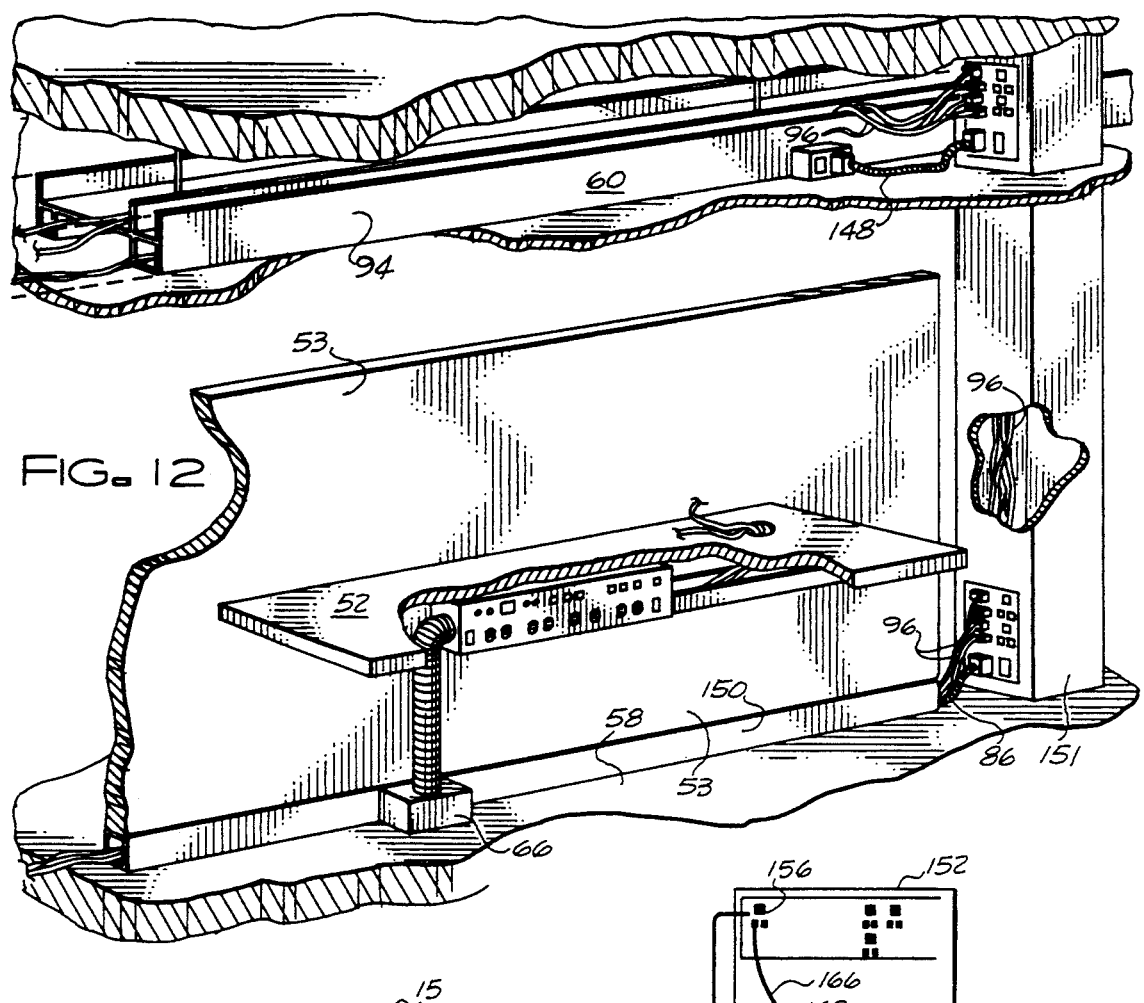
FIG. 12 shows a third embodiment of the unitized destination terminal of the present invention.

FIGS. 7 and 11 illustrate the present invention in connection with the routing of wiring in an under-floor plenum 60. In the under-floor configuration, raceway 94 is supported from beneath. FIG. 12 shows the present invention in connection with the routing of wiring in an above-ceiling plenum 60. As shown in FIG. 12, escutcheon box 66 may reside on floor 58 adjacent to a wall 53. In this above-ceiling configuration, escutcheon box 66 has a different physical configuration from that shown in FIGS. 7 and 11 because it mates to wall 53 rather than to floor 58. As is conventional with modular office furniture, the bottom of wall 53 includes a raceway 150. Accordingly, power whips 86 and bundles 96 are routed within raceway 150 from a building column 151 to escutcheon box 66. T-connectors (not shown) may be used to daisy-chain electrical power distribution within raceway 150 to multiple work areas 52 if necessary. Power and communication wiring are routed upward within column 151 to ceiling plenum 60, where they enter raceway 94 and are routed as discussed above in connection with FIG. 11. In the above-ceiling configuration, raceway 94 is suspended from above.

FIG. 13 shows communication connectivity devices and connectivity methodology used by the present invention. As discussed above, cable bundles 96 from a multiplicity of work areas 52 are collected at common communication distribution area 140. Larger installations may incorporate several of areas 140, each of which collect bundles 96 for its own group of work areas 52. For example, one of areas 140 may exist for each story in a multistory building 50 (see FIG. 6). An intermediate interconnection cabinet 152 resides at each of areas 140. Cabinet 152 separates the integrated communication cables for further distribution within the connectivity system of the present invention.

In particular, each cable bundle 96 terminates at a voice/data panel 154. Voice/data panel 154 is manufactured off-site and populated on-site. In other words, hole preparations and labeling for panel 154 are performed off-site, and connectors 106b–106d (discussed above in connection with FIG. 8) are installed on panel 154 on-site. Preferably, each of connectors 106 is the type of connector well known in the art which is mounted simply by being pushed through holes in panel 154 from the rear of panel 154. A connector triplet 156 is formed collectively by voice socket connector 106b, data socket connector 106c, and LAN socket connector 106d for each of bundles 96 terminated at panel 154. In the preferred embodiment, each panel 154 contains up to 32 of connector triplets 156, and cabinet 152 includes 3 of panels 154.

Cabinet 152 additionally includes a voice interconnect panel 158 and a data interconnect panel 160 for each voice/data panel 154. Thus, in the preferred embodiment cabinet 152 includes three of voice panels 158 and three of data panels 160. Each of voice and data panels 158–160 includes up to 32 standard 8-pin modular phone socket connectors 162 and 164, respectively. Voice jumper cables 166 and data jumper cables 168 have mating standard 8-pin modular phone plug connectors installed on opposing ends in a one-to-one correspondence. Jumpers 166-168 mate with selected ones of connectors 106b–106c, respectively, and with selected ones of connectors 162–164, respectively. As will become evident from the discussion below, the precise connectivity between connectors 106b–106c and connectors 162–164 is not an important feature of the present invention, and can be adapted to conform to a wide variety of connectivity needs. Preferably, jumpers 166–168 differ from one another only in jacket coloring, as discussed above. For the preferred embodiment, 96 of voice jumpers 166 and 96 of data jumpers 168 are required to fully connect all connector triplets 156 to panels 158–160.

Voice connectors 162 are grouped together into groups of 25 connectors each, wherein a group need not be confined to a single panel 158. Individual contacts from voice connectors 162 within each group couple to their own 200 pin socket connector (not shown) A 100 pair voice interconnect cable 170 has mating plug connectors installed at its opposing ends. Thus, all of communication signals carried by connectors 162 from a single cabinet 152 are collected in four of cables 170 for routing to a central voice connectivity area 172.

Similarly, data connectors 164 are grouped together into groups of six connectors each, wherein a group need not be confined to a single panel 160. Individual contacts from data connectors 164 within each group couple to their own 50 pin socket connector (not shown), in which two pins remain unused. A 25 pair data interconnect cable 174 has mating plug connectors installed at its opposing ends. Thus, all of connectors 164 from a single cabinet 152 are collected in 16 of cables 174 for routing to a central data connectivity area 176.

LAN jumper cables 178 have plug sockets installed on opposing ends in a one-to-one correspondence. For each jumper cable 178, one connector connects to a socket connector 106d of a connector triplet 156. The other end of each of jumpers 178 couples to a multiple access unit (MAU) 180, which is well known to those skilled in the art. MAU 180 preferably resides near cabinet 152. MAU 180 is used to interconnect LAN communications in a predetermined LAN topology, such as a ring, star, bus, and the like.

At central voice connectivity area 172 and at central data connectivity area 176, cables 170 and 174 mate with corresponding socket connectors (not shown) of a voice distribution cabinet 182 and a data distribution cabinet 184, respectively. In the preferred embodiment, cables 170–174 are connectorized off-site in a one-to-one correspondence. Thus, they can be cheaply and quickly installed in building 50 through any convenient plenum 60 (see FIG. 6). In a multistory installation, cables 170–174 from common communication distribution areas 140 on separate floors are typically routed vertically and collected together on a common floor, typically in a basement.

Distribution cabinets 182–184 break the communications signals carried by cables 170–174, respectively, into socket connectors which correspond to each of destination terminals 62 (see FIG. 7) in building 50 (see FIG. 6). As discussed above in connection with FIG. 7, voice and data communication is presented in a three socket appearance at destination terminal 62. Likewise, distribution cabinets 182 and 184 duplicate this appearance so that each four-pair group of wires which couples to an individual destination terminal 62 for voice and data communication are presented using three standard modular phone sockets.

FIG. 14 provides the interconnection definition used by the preferred embodiment of the present invention for this appearance at destination terminal 62 and at cabinets 182–184. This definition is configured to maximize the flexibility achievable in utilizing the four pairs of wires for communications, whether voice or data. In particular, a modular phone socket is configured as having up to 8 contacts, each of which is located at its own predetermined position. FIG. 14 identifies these eight positions with the numerals 1–8. While eight positions are defined, many voice and data communication devices require only 6 (three pair) or 4 (two pair) contacts. Thus, a six-pin standard modular phone plug and a four-pin standard modular phone plug are commonly utilized by communication devices. The six-pin modular plugs mate with the central six positions of the modular socket, and the four-pin modular phone plugs may mate with the central four positions of the modular socket.

Using the eight predetermined positions illustrated in FIG. 14, the preferred embodiment of the present invention couples a first pair of wires 186 to contacts which populate the third and sixth positions of a first socket 188, the fourth and fifth positions of a second socket 190, and the second and seventh positions of a third socket 192. A second pair 194 couples to contacts which populate the first and second positions of socket 190 and the fourth and fifth positions of socket 192. A third pair 196 couples to contacts which populate the fourth and fifth positions of socket 188 and the third and sixth positions of socket 190. A fourth pair 198 couples to contacts which populate the seventh and eighth positions of socket 190 and the third and sixth positions of socket 192.

Accordingly, the appearance defined by the present invention permits simultaneous use of a two-pair device mated with socket 188 and a three-pair device mated with socket 192. Similarly, a two-pair device mated with socket 188 may be simultaneously used with a two-pair device mated with socket 192. And, three two-pair devices may be mated with their own ones of sockets 188–192. All of these applications occur without causing interference with one another because none of pairs 186–198 are used by more than one device. Of course, a single four-pair device may also be used by mating it with connector 190.

With reference back to FIG. 13, distribution cabinets 182–184 each include an appearance as defined in FIG. 14 for each four-pair group of wires routed thereto. These appearances electrically couple to 200 pin and 50 pin connectors for mating with cables 170 and 174, respectively. The coupling may advantageously result from the use of schemes similar to those discussed above for panels 158–160. From distribution cabinet 182, voice jumper cables 200 couple voice communications from the appearances of sockets 188–192 (see FIG. 14) to a voice cross-connect cabinet 202. Likewise, from distribution cabinet 184, data jumper cables 204 couple data communications from the appearances of sockets 188–192 to a data cross-connect cabinet 206. Preferably, each of jumpers 200 and 204 includes a four-pair cable coupled in a one-to-one correspondence between standard modular 8-pin phone plugs. With four-pair cables, any cable may be used with any of sockets 188–192. However, nothing prevents the use of two-pair and three-pair cables to mate only with sockets 188 and 192, respectively (see FIG. 14).

Cross-connect cabinets 202 and 206 couple data from standard modular two-pair, three-pair, and four-pair sockets, as discussed above in FIG. 14, to conventional coupling blocks or connectors to which a buildings voice and data communications interface in a conventional manner. Such interfaces couple voice cross-connect cabinet 202 to a building's PBX (not shown) and couple data voice cross-connect cabinet 206 to a mainframe computer's front-end controllers (not shown).

Figure 15:
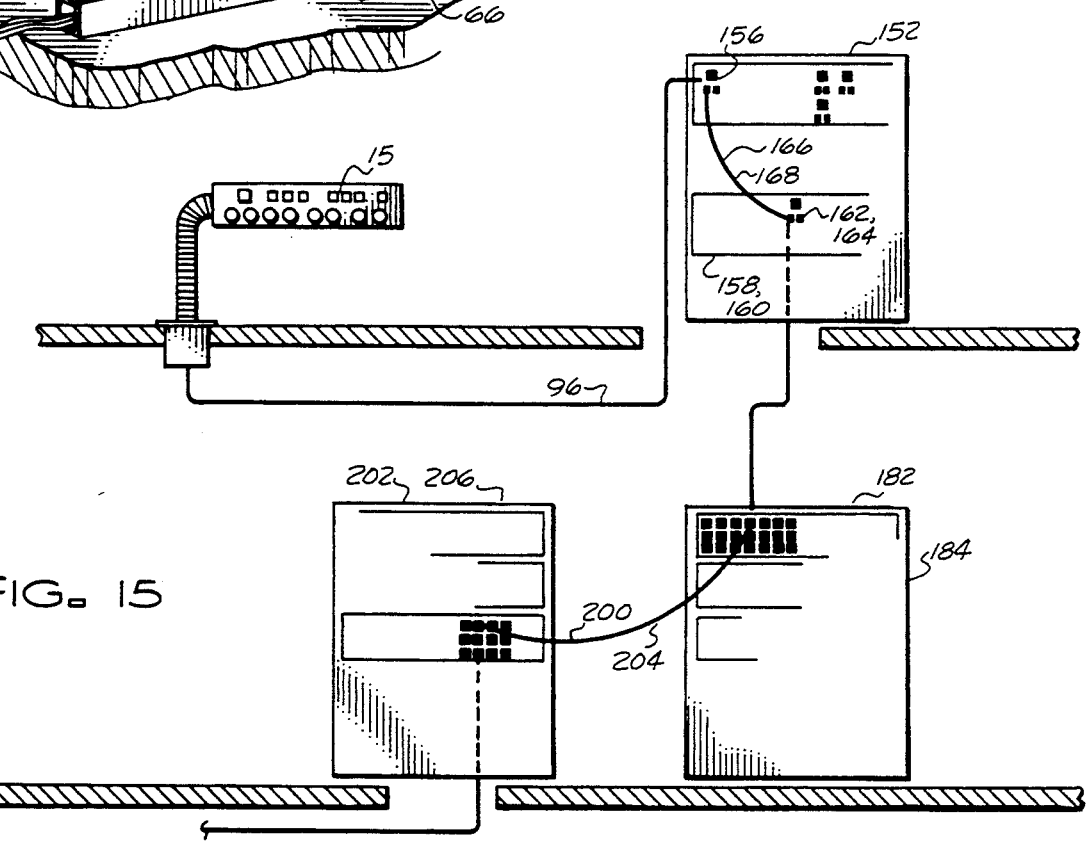
FIG. 15 shows a cable tracking system implemented in accordance with the present invention.

FIGS. 15 and 16 together show labeling and tracking features of the present invention. These labeling and tracking features aid the management of connectivity. Specifically, building 50 (see FIG. 6) is assigned a grid nomenclature or code which uniquely identifies the physical locations of each of work areas 52. In addition, each socket connector in cabinets 152, 202 and 206 is assigned a unique panel nomenclature or code to identify the sockets. Preferably, this nomenclature is printed on the cabinets near the corresponding sockets or derived in such a manner that connectors are easily associated with a unique code and vice-versa. As discussed above, labels 108b-108d are attached to cables 100-104 of cable bundle 96 (see FIG. 8). In a similar manner, each communication cable and jumper cable used within the connectivity system of the present invention includes its own uniquely coded label.

A data table is formed to include a multiplicity of data records similar to a data record 208 illustrated in FIG. 16. Preferably, this data table is maintained in a computer database (not shown) for fast and convenient searching, sorting, and alteration. Upon initial installation, jumpers 166, 168, 200, and 204 (see FIG. 13) may be installed in accordance with a predetermined pattern. For example, a first connector triplet 156 may couple through a voice jumper 166 to a first voice socket 162, and a first appearance at cabinet 182 may couple to a first appearance at cabinet 202, and so on for the remaining voice communication and data communication channels. This predetermined pattern connects to all communication circuits to cross-connect cabinets 202 and 206. Wiring between a PBX or mainframe controller and cabinets 202 and 206 completes connectivity and assigns external identifiers, such as phone numbers, terminal numbers, and the like. The external identifiers, cable labels, cabinet labels and grid-codes are all recorded in a record 208 for each circuit in the connectivity system of the present invention. The data table thus supplies a complete connectivity definition for the connectivity system of the present invention.

The present invention permits easy connectivity changes. Accordingly, when physical environment changes occur, employees leave or move, or in other circumstances, the data table may be consulted to identify jumpers which must be moved to make a desired connectivity change. For example, the data table identifies the cross-connect cabinet position associated with an old phone number or computer terminal number, and the intermediate cabinet connector positions associated with a new building grid code. By re-connecting the old phone number cabinet position to the new building grid code connector position through appropriate jumper movement, a connectivity change takes place. Such a change requires no hard-wiring changes, and may be quickly and successfully concluded by building maintenance personnel. Once concluded, the data table is updated to reflect the new connectivity definition. In a preferred embodiment, conventional database software is adapted to access the data table. By entering old identifiers, such as a phone number and computer terminal number, and a new grid location, the computer generates specific jumper removal and jumper installation instructions to effect a desired connectivity change. So long as the instructions are followed, the data table remains current.

In summary, what has been described is a workstation pre-wiring module whereby workstations may be readily pre-wired to accommodate the various power and communication line connections required by a wide variety of equipment and devices anticipated to be used at the workstation. The pre-wiring module is intended for use with workstations of various designs, styles and manufacture.

The present invention provides an improved system for connectivity management within a building. Significant improvements in initial installation costs result from the extensive use of modular components which are fabricated and tested off-site, then installed quickly without the need of significant highly skilled labor. Flexibility improvements result from the minimization of on-site hard-wiring and from the integration of diverse communication facilities within the modular components. Specifically, each work area is equipped with many communication channels that may be used for a wide variety of communication services.

The present invention has been described above with reference to preferred embodiments. However, those skilled in the art will recognize that changes and modifications may be made in these preferred embodiments without departing from the scope of the present invention. For example, the particular materials used in the present invention are chosen primarily for safety. Consequently, plenum-rated materials are generally preferred for fire safety. However, a wide degree of variation in such materials is permissible so long as the materials chosen are generally safe. These and other changes and modifications which are obvious to those skilled in the art are intended to be included within the scope of the present invention.

What is claimed is:

1. A communication connector appearance for use in a connectivity management system to terminate first, second, third, and fourth pairs of wires, said connector appearance comprising:
    a first socket having a predetermined physical shape and contacts positioned at first, second, third, fourth, fifth, sixth, seventh, and eighth predetermined positions relative to said predetermined shape, wherein:
        said first pair couples to contacts in said fourth and fifth positions,
        said second pair couples to contacts in said first and second positions,
        said third pair couples to contacts in said third and sixth positions, and
        said fourth pair couples to contacts in said seventh and eighth positions; and
    a second socket having substantially said predetermined physical shape and contacts positioned substantially at said second, third, fourth, fifth, sixth, and seventh positions relative to said shape, wherein:
        said first pair couples to contacts in said second and seventh positions,
        said second pair couples to contacts in said fourth and fifth positions, and
        said fourth pair couples to contacts in said third and sixth positions.

2. A connector appearance as claimed in claim 1 additionally comprising:
    a third socket having substantially said predetermined physical shape and contacts positioned substantially at said third, fourth, fifth, and sixth positions relative to said shape, wherein:
        said first pair couples to contacts in said third and sixth positions, and
        said third pair couples to contacts in said fourth and fifth positions.

3. A connector appearance as claimed in claim 1 wherein said predetermined physical shape and said first, second, third, fourth, fifth, sixth, seventh, and eighth positions are cooperatively configured to mate with a standard modular telephone plug.

* * * * *

UNITED STATES PATENT AND TRADEMARK OFFICE
CERTIFICATE OF CORRECTION

PATENT NO. : 5,340,326
DATED : August 23, 1994
INVENTOR(S) : Dolan M. LeMaster

It is certified that error appears in the above-indentified patent and that said Letters Patent is hereby corrected as shown below:

Column 1, Line 8, after "1988", please insert --, now abandoned--.

Signed and Sealed this

First Day of November, 1994

Attest:

BRUCE LEHMAN

*Attesting Officer*        *Commissioner of Patents and Trademarks*